United States Patent [19]

Kondo et al.

[11] 4,034,857
[45] July 12, 1977

[54] VEHICLE DISC BRAKE

[75] Inventors: Toshio Kondo, Chiryu; Yoshinori Moir; Kirou Kizaki, both of Toyota, all of Japan

[73] Assignees: Aisin Seiki Co., Kariya; Toyota Jidosha Kogyo Kabushiki Kaisha, Toyota, both of Japan

[21] Appl. No.: 671,372

[22] Filed: Mar. 29, 1976

[30] Foreign Application Priority Data

Apr. 4, 1975 Japan .............................. 50-40852

[51] Int. Cl.² ............... F16D 55/224; F16D 66/02
[52] U.S. Cl. ................ 188/73.3; 188/1 A; 188/73.5
[58] Field of Search ......... 188/1 A, 72.4, 73.3–73.5

[56] References Cited

U.S. PATENT DOCUMENTS

| 3,670,300 | 6/1972 | Depenheuer | 188/1 A UX |
| 3,710,896 | 1/1973 | Machek | 188/73.5 |

*Primary Examiner*—Duane A. Reger
*Attorney, Agent, or Firm*—Pierce, Scheffler & Parker

[57] ABSTRACT

A vehicle disc brake of the type in which friction pads are adapted to be urged by hydraulic fluid acting means into engagement with opposite faces of a friction disc and the hydraulic fluid acting means has a sliding fit on a stationary part of the vehicle wheel and is of a caliper or saddle form to straddle a peripheral portion of the disc together with the pads which when actuated, is in abutment engagement therewith. The brake is characterized by a provision of a resiliently urged abutment connection of the saddle member to one of the pad assemblies at one side of the disc having a sliding fit on the stationary part.

4 Claims, 6 Drawing Figures

VEHICLE DISC BRAKE

BACKGROUND OF THE INVENTION

This invention relates to a vehicle disc brake of the kind in which friction pads are adapted to be urged by hydraulic fluid acting means into engagement with opposite faces of a friction disc and more particularly to the type in which the hydraulic fluid acting means has a sliding fit on a stationary part of the vehicle wheel and is of a caliper or saddle form to straddle a peripheral portion of the disc together with the pads which, when actuated, is in abutment engagement therewith.

As used herein the term "caliper or saddle" refers to the hydraulic fluid acting means and the terms "floating type" refer to a type in which the caliper is free to slide on the stationary part of the wheel in the axial direction of the rotation disc.

In this type, minimization of vibration is demanded for the calipers in order to ensure a sufficient sliding fit condition on the stationary part during the longer service life of the device by ensuring a prompt and sensitive response to the varying brake operating fluid pressure, safety being thus achieved.

In order to meet such requirement, there have been provided in the art various types of supporting means for the calipers. One of the types is that in which the saddle is slidingly supported at one side of the disc on a pair of parallel pins extending from the stationary part of the wheel, while at the other side also being slidingly supported on a pair of similar pins or guiding rails in the stationary part. Another type is that in which at one side of the disc the saddle is bolted or otherwise fastened to the corresponding side pad assembly which is in turn slidingly supported on a pair of parallel guiding pins or rails integral with the stationary part, In the conventional types, miniminzation of tolerance is accordingly required of the sliding engagement portions in the device in order to ensure the best sliding fit condition of the caliper or saddle on the stationary part. This requirement is considered to be a drawback in that, a very heavy burden is imposed in manufacturing the device because of difficulty in achieving such minimization of tolerance. The drawback is apt to offer an obstruction to reducing the substantial manufacturing costs.

SUMMARY OF THE INVENTION

The principal object of the invention is therefore to provide a disc brake device having improved means for supporting the saddle without necessity of such severe limitation of the tolerance as required in the conventional types.

The foregoing object and others are attained according to at least one aspect of the present invention through provision of a resiliently urged abutment connection of the saddle member to one of the pad assemblies at one side of the disc having a sliding fit on the stationary part.

Another object of the invention is to provide means for beneficially providing a resiliently urging leaf spring means having a resilient branch which is active upon one of pad assemblies other than the one against which the saddle is spring biased toward abutment.

Still another object of the invention is to provide a warning member in the leaf spring means to have the driver become aware of the danger that the thickness of the brake pad is near the limit.

Thus in the disclosed embodiment of the invention, there are provided a friction disc secured to a rotational portion of a vehicle wheel assembly to rotate therewith, a stationary member secured to a fixed portion of the vehicle wheel assembly, a movable member being slidingly fit on a pair of guiding means fastened to said stationary member by releasably securing means at one first side of the disc, brake actuating means fluidically operated within said movable member, a first pad being slidingly fit on the stationary member at the first side of the disc for shifting in the axial direction of the rotating disc to be applied to one face of the disc directly by said brake actuating means in the braking operation, a second pad slidingly carried by said stationary member at the other oppsite second side of the disc also to be brought into contact with the opposite face of the disc under a reactional force derived from application of the first pad to the disc, and means to support said movable member in resiliently urged abutment relation with said second pad.

DESCRIPTION OF THE PREFERRED EMBODIMENT

Figure 1:
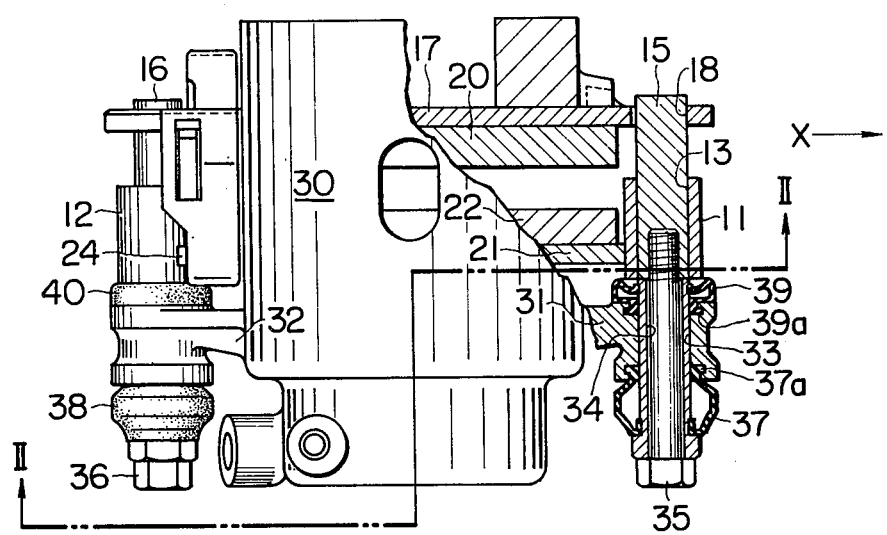
FIG. 1 is a plan view of the device, partially cut away, of the present invention.
Figure 2:
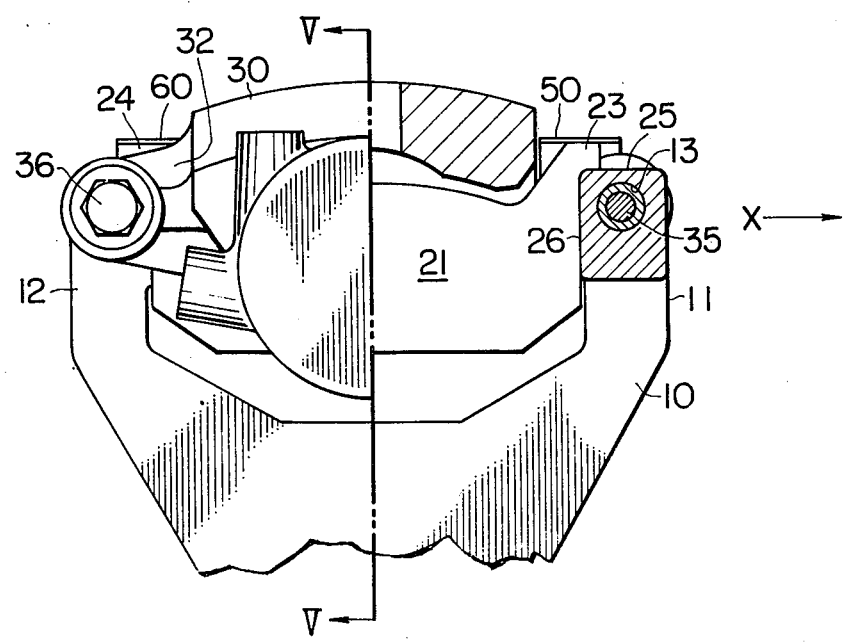
FIG. 2 is an elevational view of the device of FIG. 1; part of which is a cross sectional view taken along the line II —II in FIG. 1.
Figure 3:
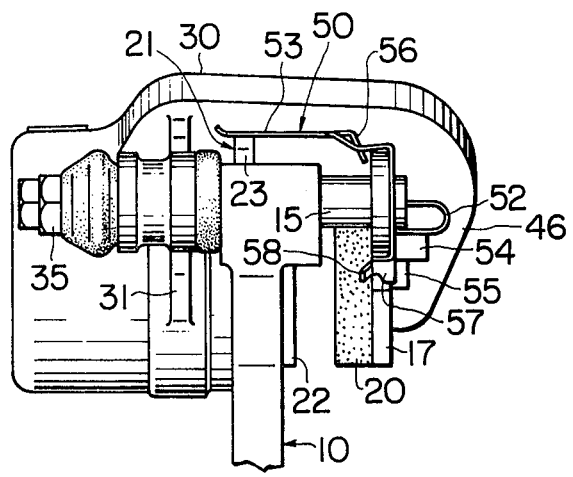
FIG. 3 is a side view of the device viewed from the right in FIG. 1.
Figure 4:
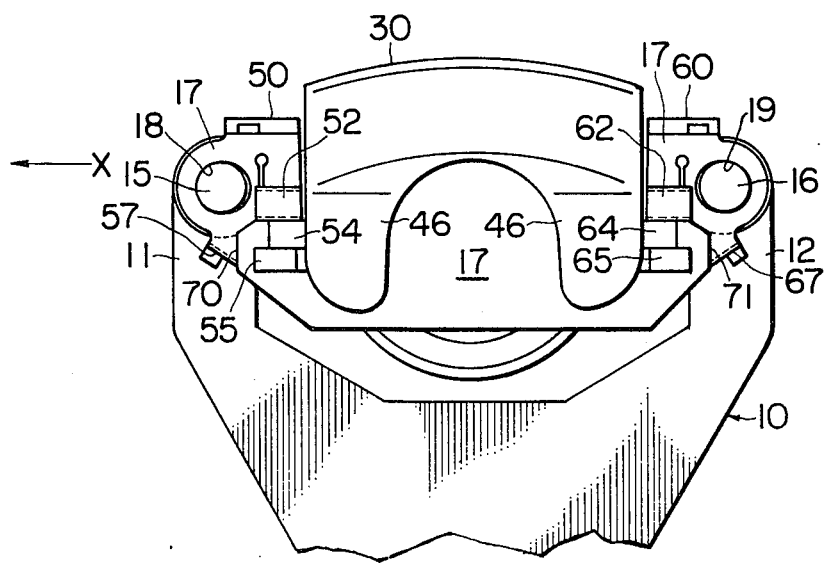
FIG. 4 is an elevational back view viewed from the opposite side of the device to that of FIG. 2.
Figure 5:
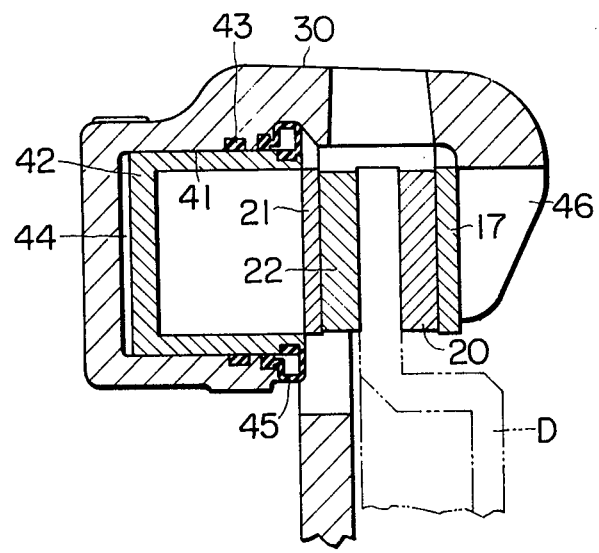
FIG. 5 is a cross sectional view taken along the line V —V in FIG. 2.

In the brake illustrated in FIGS. 1 to 4, particularly in FIG. 4, a stationary member generally indicated at 10 has a pair of spaced arms 11 and 12 having respectively eyes at their extremities as best shown in FIGS. 1 and 2 (only one eye 13 appearing in the Figures). The stationary member 10 is secured to a fixed support (not shown) of a vehicle wheel axle (not shown) forming a stationary part of wheel assembly. The stationary member 10 is secured to the fixed support portion adjacent to one side of a brake disc D (FIG. 5). The eye 13 of the arm 11 firmly receives therein a pin 15 by means of welding or otherwise securing techniques. The pin 15 extends outwardly from one side of the arm and is threaded onto a bolt 35 at the other end in alignment therewith. The other arm 12 is provided with a similar pin 16 which is secured in the same manner as the other pin 15. As seen in FIG. 1, both pins 15 and 16 are parallel to each other and slidably carry a backing plate 17 with its holes 18 and 19 having a sliding fit thereon. To the backing plate 17 is bonded or otherwise secured an outer lining 20 as best shown in FIG. 1 to form an indirectly actuated outer pad assembly. Another backing plate 21 is provided on its inside face with an inner lining 22 also bonded or otherwise secured thereto to form the known directly actuated pad assembly as best shown in FIGS. 1 and 5 to be described as the description proceeds. The backing plate 21 is formed with a pair of lugs 23 and 24 extending oppositely from opposite edges of the backing plate 21 as best shown in FIG. 2. Both arms 11 and 12 have a right angled portion formed on the horizontal and vertical faces as shown at 25 and 26 in FIG. 2. The right angled portions provide means for slidingly supporting the backing plate 21 as will be further described in the following. It should be noted that the width of the backing plate 21 must be so calculated in design that a suitable slight clearance may be provided between each edge of the backing plate and the corresponding vertical face of each of the arms 11 and 12. The backing plate 21 is thus able to slide in the perpendicular direction to the plane of the drawing in FIG. 2 with both lugs 23 and 24 having a sliding fit on the arms.

The holes 18 and 19 in the outer backing plate 17 either may be of circular or elliptical form provided that each hole allows sufficient clerance between the arcuate inside face of each pin to provide a space therebetween. This is very important to obtain a desired results which will be apparent as the discussion proceeds.

The hydraulic acting means has a saddle or caliper 30 having a pair of supporting arms 31 and 32 extending from the opposite sides thereof. At the right in FIG. 2, each of the arms 31 and 32 has at its extremity a through hole (only one hole 33 of the arm 31 appears in the FIG. 1). A sleeve 34 is slidably received within the hole 33. A similar sleeve is also slidably received within a corresponding hole (not shown) of the other arm 32. The sleeve 34 is bolted to the pin 15 in alignment relation by means of the bolt 35 threaded into the pin. It should be noted that the bolt 35 is diametrically smaller than the sleeve 34 to allow a clearance therebetween. This is desirable to permit some latitude in the parallel relationship and spaced relationship between the sleeves and bolts. Rubber boots 37 to 40 are provided for excluding dirt from the corresponding surfaces of the sleeves in the known manner.

As shown in the FIG. 5, a cylinder 41 is incorporated in calipers 30 and has a piston 42 therein. As usual, the calipers 30 has a rubber ring 43 embedded in a corresponding groove in the internal face of the cylinder 41. The ring 43 provides the known means to retract the piston 42 to the rest position when the fluid pressure is reduced in the chamber 44 defined between the internal end face of the cylinder 41 and acting face of the piston 42. A rubber boot 45 at the open end of the cylinder 41 excludes dirt from the sliding surface of the piston. As seen in FIG. 5, the caliper 30 straddles a peripheral portion of the brake disc D together with the pad assemblies at the opposite sides of the disc D. The piston 42 working in the cylinder is adapted to apply to the disc D the directly actuated lining 22 on the backing plate 21.

The known indirectly actuated friction pad assembly is formed of the lining 20 and the backing plate 17. The indirectly actuated friction pad assembly or outer pad assembly is in abutment engagement with the inside of two forked ends 46 (FIG. 4) of the caliper member 30, from the hydraulic cylinder 41.

The admission of pressure fluid into the chamber 44 results in displacement of said piston 42 and caliper member 30 in opposite directions from each other. Such movement of piston 42 urges the lining 22 into contact with the brake disc D while the caliper member 30 is caused to move under the reaction force so as to bring the other lining 20 on the opposite side of the friction disc into contact therewith.

Figure 6:
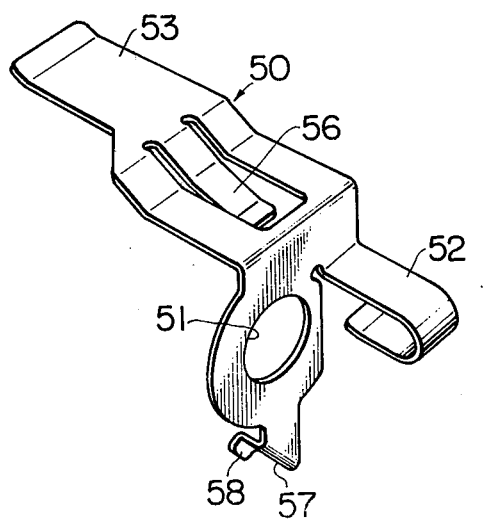
FIG. 6 is a perspective view of an element of the device.

In FIG. 6 is shown a leaf spring member or clip 50, one of which is disposed on each of the pins 15 and 16 as shown in FIG. 3. The clip 50 is made up into a generally right-angled form and has a punched hole 51 which receives the pin. The clip 50 has two spring branches 52 and 53 to engage respectively the caliper 30 and the backing plate 21 to prevent vibration and rattle, as will be described in great detail hereinafter. As shown in FIGS. 3 and 4, the branch 52 engages a swaged projection 54 in the caliper 30 to normally urge the caliper against another swaged projection 55 in backing plate 17. The other branch 53 extends beyond the outer backing plate 17 to the other backing plate 21 so as to engage the lug 23. An elastic energy is stored within both branches in order to attain the desired resilient function of the clip 50. The branch 52 and projections 54 and 55 cooperate to provide means to support the caliper 30 at the outer side of the disc D by the backing plate 17. A tongue 56 serves as a clip to hold the member 50 captive on the backing plate 17 in order to prevent it from falling off the pin 15. A branch 57 extends from a portion of the clip member 50 opposite to the branch 53 and serves to prevent the member 50 from rotation about the pin 15 by engaging a notched or recessed portion 70 in the periphery of the backing plate 17. A finger 58 further extends from the branch 57 up into the pad 21 as seen in FIG. 3. The extremity of the finger engages the disc D when the lining 20 is worn or about to be worn through the thickness of the lining. Upon the engagement of the finger with the disc, the foreign sound is produced so that the driver is warned of the danger that the lining is nearly worn through.

The other clip 60 is of the same form except that it is structurally symmetrical to the clip 50 so that duplicated description will be alleviated. In FIG. 4, it will be seen that a branch 62 of the clip 60 engages a projection 64 of the caliper 30 which in turn engages a projection 65 in the backing plate 17. Both members 50 and 60 cooperates to provide better support for the caliper 30 on the two projections 55 and 65 in the backing plate 17 when installed. It should be noted the numeral 71 indicates a recessed or notched portion similar to the notched portion 70 at the left in FIG. 4. There is also a provision for the branch 67 of the clip 60 to engage the notched portion at 71 in the same manner as that of the corresponding branch 57 of the other clip 50.

It should be noted that both bolts 35 and 36 must not be completely threaded into the pins 15 and 16 until the clips 50 and 60 are completely installed on the corresponding pins, in order to attain best abutment relation between all the projections 54, 55, 64 and 65. A suitable clearance provided between the bolts and the bushes serves to provide means for readily attaining the best sliding fit at all the sliding engagement portions of the device when the device is installed. A higher rate of tolerance is accordingly permitted for these portions than is allowed in the conventional types of the device.

When the brake is applied under the rotational condition of the vehicle wheel, assuming that the rotational direction is the X arrow direction in FIG. 2, the resulting drag force on the lining 22 is directly taken through backing plate 21 by the arm 11 at its vertical face 26 (FIG. 2). Drag force on the other lining 20 is taken by the pin 16 through the backing plate 17 at its hole 19. In case of reverse rotation of the disc, reversal takes place.

It will be noted from the foregoing that in any rotational direction of the disc D, the resulting drag forces on the opposite linings are taken uniformly by the two arms 11 and 12. The slight clearance between the inside face of each of pins 15 and 16 and the corresponding holes in the backing plate is effective to obtain the above result. Uniformity of load is thus attained in both arms 11 and 12 when the brake is applied. This is beneficial in calculating, in design, the cross sectional size of the arms for reducing the entire weight of the device.

What is claimed is:

1. A disc brake comprising:
    a friction disc secured to a rotational portion of a vehicle wheel assembly to rotate therewith;
    a stationary member secured to a fixed portion of the vehicle wheel assembly,
    a movable member having a sliding fit on a first pair of parallel guiding means fastened to said stationary member by releasable securing means at one side of said disc,
    brake actuating means fluidically operated within said movable member,
    a first pad having a sliding fit on said stationary member at one side of said disc for shifting in the axial direction of the rotating disc to engage one side of said disc directly by said brake actuating means in the braking operation,
    a second pad being slidingly supported on a second pair of parallel guiding means extending from said stationary member to engage with the opposite side of said disc under a reaction force derived from application of said first pad to said disc, and
    resilient clip means bearing against said movable member to urge the same into abutment relation against said second pad, said resilient clip means being formed of a thin gauge sheet metal of resilient nature and having a punched hole for receiving the corresponding second guiding means therein.

2. A disc brake according to claim 1, wherein the movable member has a pair of projections against which the said clip means bear and the second pad has a pair of projections against which bear the said projections of the movable member whereby the movable member is supported in resiliently urged abutment relation with the second pad.

3. A disc brake according to claim 2, wherein the clip means has a branch to resiliently urge the first pad against the stationary member to thereby prevent the first pad from vibration and rattle during braking operation.

4. A disc brake according to claim 3 wherein said clip means is formed with a warning finger extending into a lining on the second pad whereby a foreign sound is emitted when the lining is excessively worn to such a degree that the end of the finger becomes engaged with the rotating disc.

* * * * *